Nov. 30, 1965 G. A. FEDDE 3,221,286
CONNECTOR FOR PRINTED CIRCUIT STRIP TRANSMISSION LINE
Filed July 31, 1961

INVENTOR.
GEORGE A. FEDDE
BY
G. Donald Weber, Jr.
AGENT 3,221,286

CONNECTOR FOR PRINTED CIRCUIT STRIP TRANSMISSION LINE

George A. Fedde, Hatboro, Pa., assignor to Sperry Rand Corporation, New York, N.Y., a corporation of Delaware Filed July 31, 1961, Ser. No. 128,157
10 Claims. (Cl. 339—17)

This invention relates to a printed circuit connector. More particularly, this invention relates to a connector which is used to interconnect a plurality of printed circuits in the form of transmission lines and to maintain the transmission line characteristics constant throughout the system.

In view of the rapid development of thin magnetic films, there have been proposed several different methods of fabricating assemblies which can utilize these films. For example, one assembly contemplates the utilization of a pair of base members having conductors etched or printed thereon with the thin magnetic films disposed between these boards. An exact method for placing the thin magnetic films is (although possibly important for practical reasons) unimportant for the purposes of this invention. The pertinent feature, is that the printed circuit conductors adjacent the films act as transmission lines relative to the thin magnetic films. That is, a printed conductor passes both above and below each of the films. The application of signals is made to associated pairs of conductors so that signals pass both above and below a particular film.

Because of the functioning of the printed conductors as transmission lines, other problems are encountered. For example, transmission line characteristics must be maintained to a very exact degree in order to avoid reflections of signals, etc. Moreover, it must be seen that the transmission line characteristics for each one of several such assemblies must be uniform throughout the system in order to prevent the insertion of spurious information or to avoid excessive noise problems.

The connector which is the subject of this invention contemplates a means for connecting a plurality of assemblies such as described supra without adversely affecting the transmission line characteristics. Thus, by judicious fabrication of the connector, the transmission line characteristics are maintained constant throughout the entire circuit.

The connector consists generally of a thin base material having wide flat surfaces. In addition, a plurality of conductors are disposed on each of the surfaces by printing or etching or similar techniques. Furthermore, the conductors are vertically aligned so that an associated pair of conductors lies one-above-the-other on the opposite faces of the base material.

One object of this invention is to provide reliable connection between segments of printed circuit strip transmission lines.

Another object of this invention is to provide a reliable connector having a high packing density of conductors mounted thereon.

Another object of this invention is to provide a connector wherein the impedance and transmission line characteristics of the etched circuit segments are preserved throughout the connector.

Another object of this invention is to provide a connector which is flexible so as to provide for folded connections.

Another object of this invention is to provide an inexpensive connector which permits extremely accurate signal transmission.

These and other objects and advantages of the invention will be readily apparent with the reading of the accompanying description in conjunction with the attached drawings in which.

Figure 1:
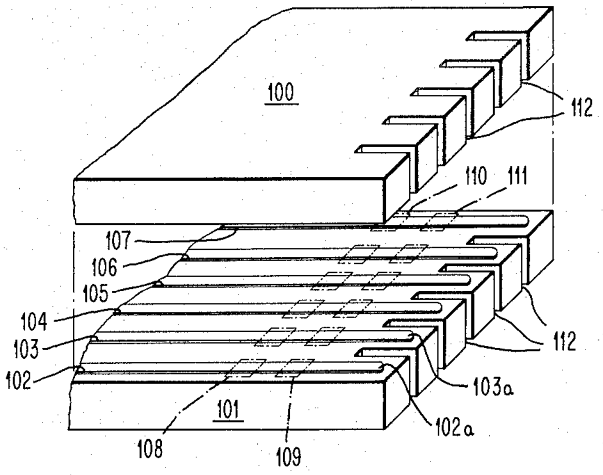
FIGURE 1 is a perspective and exploded view of a type of etched-circuit assembly segment.

Referring to FIGURE 1, there is shown an exploded view of a type of etched circuit assembly. The assembly primarily consists of base members 100 and 101. These members may be fabricated of any of the usual materials on which printed or etched circuits are disposed. For example, the base material may be a glass-epoxy or a paper-epoxy or other similar material on the order of $\frac{1}{16}$ inch thick. A plurality of electrical conductors 102 through 107 inclusive, may be etched or printed thereon. It is to be understood, of course, that the number of conductors on the base material is not limited to the number shown on the figure. That is, there may be more or less conductors printed on the base material. The greatest number of conductors on the base is limited only by the limitations of the etched or printed circuitry techniques utilized and the size of the base. Moreover, although not shown, it is to be understood that there are printed conductors on base 100 which mate with those shown on base 101.

The preferred embodiment of the invention shown in FIGURE 1 incorporates a gold plated pad **102*a***, for example, at the end of each conductor. It should be clear that it is not absolutely necessary to gold plate these pads but in order to provide a better and more reliable electrical contact the gold plating is preferred.

In addition, a plurality of thin magnetic films may be placed on the base member 101 over the conductors 102–107. The thin films are illustrated by elements 108 to 111. Again, the number of films is not specified inasmuch as these films may be used for performing any type of logical function. According to the example shown in FIGURE 1, the films may be utilized to provide a memory matrix, for example, but the illustration of two rows of six films each is not to be construed as a limitation of the invention. In fact, the number of magnetic elements is specifically left to be determined by the desired utilization of the device.

The number of thin magnetic film elements which can be utilized is dependent upon the packing density of the printed conductors as well as the minimum size for magnetic thin films. A typical example would utilize a base of approximately seven inches in width by ten inches in length on which a 32 by 64 array of magnetic thin films is disposed. The particular type of film is not specified but there may be provided disks having between 0.02 and 0.05 inch outer diameters. This size film disk is practical and can be used with conductors on the order of 0.05 inch center spacing. In order to provide a square arrangement of film elements, a similar board may be connected to the first board by means of the connector device which is the subject of this invention and will be described infra, whereby the 32 element directions are combined to provide 64 element rows.

By placing board 100 on top of board 101, a sandwich-like arrangement may be fabricated wherein the thin magnetic film elements 108 through 111, etc., are sandwiched between the two base members 100 and 101 and adjacent the printed circuit conductors 102 through 107. A clamping device (see FIGURE 3) may then be placed near the edges of the two adjacent base members. By tightening the clamp device, the sandwich assembly is maintained in close adjacent disposition.

In order to provide for reliable contact between the conductors on the base members 100 and 101 and the conductors on the connector (see FIGURE 2), it will be seen that it is desirable to provide slots between each of the conductors. Thus, 0.005 to 0.010 inch wide slots 112 are sawed or molded about ⅜ to ½ inch into the board between the pads 102*a* and 103*a* for example. This operation, therefore, provides independent "fingers" such that the contact lands or pads are each mounted to be individually flexible. Consequently, when the clamping device is tightened to the desired degree, the contact of each and every conductor line with the associated conductor on the connector element 200 is assured regardless of the possible inconsistency of the pad thickness.

Figure 2:
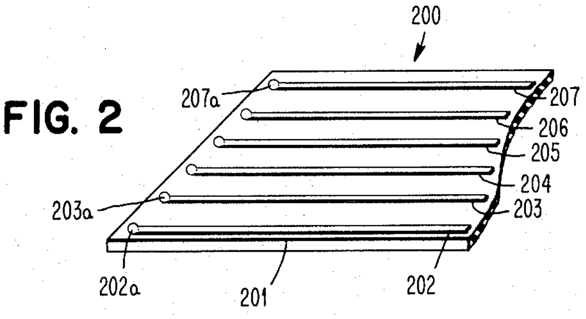
FIGURE 2 is a perspective view of the connector which is the subject of the invention.

Referring now to FIGURE 2, there is shown a perspective view of the connector element 200. It is to be understood that the reverse face is substantially identical to the surface which is shown. The base member 201 of the connector element 200 may be fabricated of a Teflon glass material, epoxy-glass or other suitable material and having a typical thickness about the same as the separation of the top and bottom boards of the sandwich assembly or about 2 to 8 mils. Typically, Teflon (the trademark of the DuPont Co.) may be considered as a fluorocarbon resin, as for example, polytetrafluoroethylene or polytrifluorochloroethylene. For many reasons, it may be preferred that this material be flexible in nature. However, it is not to be limited thereto and it is contemplated that the base member 201 may be fabricated of a substantially rigid material or, in some cases, it may have a greater thickness.

On the surface of member 201 there are plated or etched a plurality of printed conductors, for example conductors 202 through 207 inclusive. The number and fabrication of conductors on the connector element is substantially similar to the number and fabrication of conductors on the bases 100 and 101 of the sandwich assembly. It is to be understood, of course, that a plurality of similar connector elements may be used in parallel to each other thereby providing for the use of smaller connectors with larger printed circuit sandwich assemblies.

As indicated supra, the fabrication of the sandwich assembly with the magnetic thin films therein, utilizes transmission line techniques and inherently includes transmission line problems such as characteristic impedance, impedance matching, etc. In order that the transmission line properties are not inconsistent and discontinuous between a plurality of such boards, it is clear that the connector element must have transmission line characteristics similar to those of the assemblies to be connected. The transmission line characteristics are determined by the thickness of the base member 201, the width of the conductor lines 202–207, for example, and the relative dielectric constant of the base member 201. By properly adjusting these two dimensions, the transmission line characteristics of the sandwich assembly may be incorporated into the connector element whereby there will be no reflections of signals being transmitted on these transmission lines. The formula for computing these parameters is as follows, and is valid for $$\frac{d}{w} \leq \frac{1}{10}: Z_0 = 377\frac{d}{w}\sqrt{\frac{Mr}{Er}}$$

where:

$d$=distance between conductors
$w$=width of conductors
$Mr$=relative permeability of the medium between the conductors
$Er$=relative dielectric constant of the medium between the conductors.

In addition, the time delay in seconds/meter may be obtained by the following formula using the constants listed above:

$$Td = \tfrac{1}{3} \times 10^{-8}\sqrt{Mr\ Er}$$

As in the case of the contact lands 102*a*, 103*a*, etc. of FIGURE 1, there are contact terminals 202*a*, for example, at each end of the conductors 202, etc. in FIGURE 2. These contact terminals may also be gold plated in order to assure good contact with the lands 102*a* etc. Moreover, it should be noted that prior to the gold plating, the contact terminal end of the conductor is heavily plated in order to provide a raised contact terminal which is 15 to 20 mils above the surface of the base material 201. Thus, when the connector element is inserted into the ends of the sandwich area between the individual flexible "fingers," contact is made between the gold plated land and the gold plated raised contact terminal.

Figure 3:
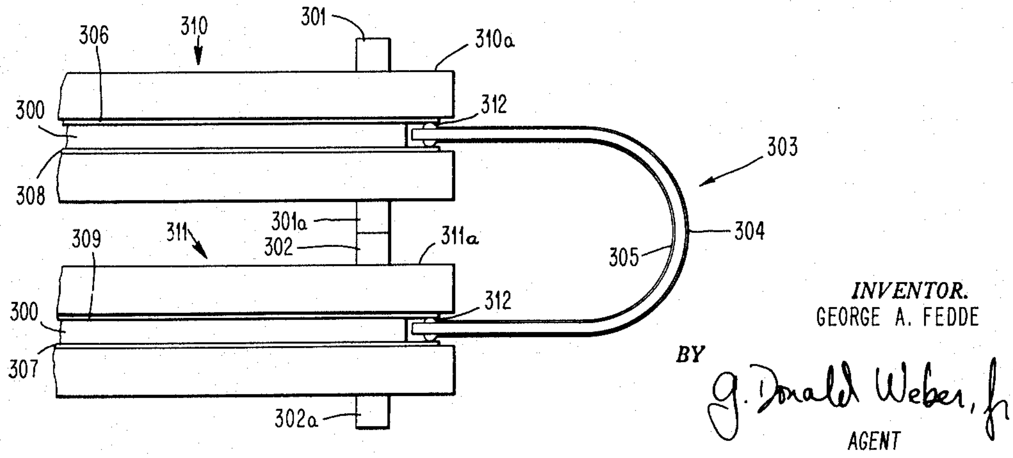
FIGURE 3 is a cross-sectional view of a typical application of the connector.

Referring now to FIGURE 3, there is shown a side view of a typical interconnection of two sandwich assemblies 310 and 311 made by a connector element 303. Only one end of each sandwich is shown in order to avoid extraneous material and to present the showing as clearly and concisely as possible. The two sandwich assemblies each comprise two bases as well as an insulating spacer material 300 therebetween. This spacer material spaces the printed circuit conductors apart whereby transmission line properties are preserved and short circuits are avoided. In some cases, the insulating spacer may, in fact, comprise the substrate upon which the thin films are disposed. That is, the films need not be placed directly on the printed circuit board as suggested in FIGURE 1, but may be placed on the thin insulating spacer 300 (as shown in FIG. 3) which spacer material is then placed in the sandwich. By placing the magnetic films on the spacer, alignment of the magnetic elements and the associated conductors can be assured. Moreover, by using a different thickness spacer 300, the transmission line characteristics of the sandwich assembly may be altered, inasmuch as the conductors would be spaced either further apart or closer together depending upon the thickness of the spacer. The spacer material can be an insulator and in fact, may be omitted provided means are supplied to insure that the printed conductors will not be shorted to one another.

The clamps 301, and 302 are shown attached to the two sandwich assemblies. In particular, the clamp 301 which is connected with sandwich assembly 310 may comprise any type of clamp known in the art. For example, a very common arrangement could include elongated bars 301 and 301*a* which extend beyond the sides of the sandwich 310 whereby bolts (not shown) could be passed readily through each of the clamp members and tightened. A similar clamp is indicated by members 302 and 302*a*. In addition, it is to be noted that the clamp arrangement previously described also applies to members 302 and 302*a*. Thus, each of the members 301, 301*a*, 302, and 302*a* can be vertically aligned and a single bolt (not shown) passed through the entire assembly. If this arrangement is utilized, it will become clear that one of the members 301*a* or 302 could be eliminated due to the fact that the single remaining member could perform the function as well as two members.

The connector element 303 is shown connected between the two ends of the sandwich 310 and 311. In this particular embodiment, the connector element is shown as being fabricated of a flexible material. It will be seen, that there are conductors 304 and 305 on the opposite faces of the connector element 303. These conductors are similar to those shown in FIGURE 2 and designated as conductors 202 and 203 etc. It can be seen that the conductor 304 couples the conductors 306 and 307 of the assemblies 310 and 311 respectively. The conductor 305 connects the conductors 308 and 309 of the assemblies 310 and 311 respectively. As suggested supra, the conductors, for example conductors 307 and 309 of the assembly 311, then continue to the opposite edge of the sandwich assembly and are connected to another connector element similar to connector 303 which may pass then to a further sandwich assembly (not shown) or it may in fact pass to the external circuitry (not shown).

It may be seen that the raised contact 312 for example (similar to contact 202*a* in FIGURE 2), is in contact with the associated land or pad (similar to pad 102*a* in FIGURE 1), whereby the contact is insured. However, it will be seen that the ends 310*a* and 311*a* of the respective assemblies are somewhat deformed. This is of course, due to the fact that the contacts 312 are raised, as described supra. Furthermore, the clamping action of clamping devices 301 and 302 insures that the base members of the sandwich assemblies will be as close as possible while permitting individual flexing of the various fingers as suggested in FIGURE 1.

It is to be understood that certain changes may be incorporated into the connector element described supra in order to accommodate various conditions of the sandwich-like assemblies which are contemplated. Thus, if small changes are made in the assembling of the sandwiches (which is not part of the invention per se) small changes may be required in the contact element. Moreover, the packing density of the conductors of the connector element is limited only by the limitations of etched circuit techniques as well as the dimensions of the magnetic elements which may be used in the sandwich assembly shown in FIGURE 1. In addition, the connectors may be utilized to make connections between any similar type of sandwich assembly.

Having thus described the invention, what is claimed is:

1. An interconnection system comprising a circuit mounting assembly including a pair of parallel, spaced apart conductor supporting elements whereby transmission line coupling is effected therebetween, each of said supporting elements including a plurality of independent flexible fingers at the ends thereof each of which carries one electrical conductor, and a printed circuit connector comprising an electrically insulating base and a plurality of electrical conductors on said base, said conductors arranged on said base so that an associated pair of conductors is mounted on the opposite surfaces of said base in vertical alignment thereby to form an effective transmission line.

2. An interconnection system comprising a circuit mounting assembly including a pair of parallel, spaced apart conductor supporting elements each of which carries a plurality of conductors whereby transmission line coupling is effected therebetween, each of said supporting elements including a plurality of independent flexible fingers at the ends thereof, each of said fingers carrying only one electrical conductor, and a printed circuit connector comprising an electrically insulating base member, said base member fabricated of a thin, flat, flexible material and adapted to be inserted into said mounting assembly, a first plurality of electrical conductors on one side of said base member, and a second plurality of electrical conductors on the other side of said base member, said first and second pluralities of conductors arranged in vertical alignment so that an associated pair of conductors is mounted on the opposite surfaces of said base member thereby to form an effective transmission line, said first and second pluralities of conductors on said connector mating with the pair of pluralities of conductors on said mounting assembly.

3. An interconnection system comprising a circuit mounting assembly including a pair of parallel, spaced apart support elements, each of said support elements carrying a plurality of conductors so aligned that transmission line coupling is effected therebetween, each of said supporting elements including a plurality of independent flexible portions at the ends thereof, each of said flexible portions carrying only one electrical conductor, and means for connecting a plurality of circuit mounting assemblies comprising a flexible, plastic-like base member, and a plurality of electrical conductor paths affixed to opposite surfaces of said base member in vertical alignment thereby to form an effective transmission line, the effective transmission lines of said assembly and said connector having substantially identical operating characteristics.

4. An interconnection system comprising a circuit mounting assembly including a pair of parallel, spaced apart circuit boards, said circuit boards each having a plurality of conductors mounted thereon, said conductor pluralities aligned such that transmission line coupling is effected therebetween, each of said supporting elements having a plurality of slots at the ends thereof whereby a plurality of independently flexible portions are provided each of which carries one electrical conductor, and a connector element comprising a thin, electrically-insulating base, a first plurality of electrical conductors affixed to one side of said base, and a second plurality of electrical conductors affixed to the other side of said base, said first and second pluralities of conductors arranged in vertical alignment so that an associated pair of conductors is mounted on the opposite surfaces of said base thereby to form an effective transmission line, said transmission line having characteristics substantially identical to the assembly being connected thereto.

5. An interconnection system comprising a circuit mounting assembly including a pair of parallel, spaced apart conductor supporting elements, said conductors being aligned such that transmission line coupling is effected therebetween, each of said supporting elements including a plurality of independent flexible fingers at the ends thereof each of which carries one electrical conductor, and a printed circuit connector comprising an electrically insulating base and a plurality of electrical conductors on said base, said conductors arranged so that an associated pair of conductors is mounted on the opposite surfaces of said base in vertical alignment thereby to form an effective transmission line, said mounting assembly and said connector adapted to mate together such that associated conductor pairs are connected together to form an extended transmission line, the characteristic impedance of said extended transmission line being determined as a function of the space between the conductors and the dielectric constant of said space and being substantially constant.

6. An interconnection system comprising a plurality of circuit mounting assemblies including a pair of parallel, spaced apart conductor supporting elements whereby transmission line coupling is effected therebetween, each of said supporting elements including a plurality of independent flexible fingers at the ends thereof each of which carries one electrical conductor, and a connector element comprising a thin, electrically-insulating base, a first plurality of electrical conductors mounted on one side of said base, and a second plurality of electrical conductors mounted on the other side of said base, said first and second pluralities of conductors arranged in vertical alignment so that an associated pair of conductors is mounted on the opposite surfaces of said base thereby to form an effective transmission line, said transmission line thus formed having characteristics substantially identical to the transmission lines provided by the assemblies connected thereby.

7. An interconnection system comprising, a circuit mounting assembly including, a pair of parallel conductor supporting elements, insulating spacer means disposed between and spacing apart said conductor supporting elements such that transmission line coupling is effected between the conductors supported thereby, each of said supporting elements being fabricated of nonconductive material and including a plurality of independent flexible fingers at the ends thereof, each of said fingers carrying one electrical conductor, a connector adapted to join together circuit mounting assemblies and comprising an electrically insulating base member, said base member fabricated of a thin, flat, flexible material, a first plurality of electrical conductors on one surface of said base member, a second plurality of electrical conductors on the other surface of said base member, said first and second pluralities of conductors arranged in vertical alignment so that an associated pair of conductors is mounted on the opposite surfaces of said base member thereby to form an effective transmission line, said first and second pluralities of conductors on said connector mating with the conductors on said mounting assemblies to provide continuous transmission line operation therebetween, and clamp means in juxtaposition to said conductor supporting elements adjacent the fixed ends of said flexible fingers for holding together said pair of conductor supporting elements and said connector.

8. The interconnection system recited in claim 7 wherein the characteristics of the several transmission lines are dependent upon the width of the respective conductors, the spacing therebetween and the dielectric constant of said spacing, and said characteristics are substantially similar in all joined transmission lines.

9. A connector device comprising, a circuit mounting assembly including a pair of parallel conductor supporting elements, a plurality of conductors disposed on each of said supporting elements, insulating spacer means having a dielectric constant disposed between and spacing apart said conductor supporting elements such that transmission line coupling is effected between the conductors supported by said supporting elements, each of said supporting elements including a plurality of independent flexible fingers at the ends thereof each of which carries one of said electrical conductors, a connector comprising an electrically insulating base member, said base member fabricated of a flat flexible material having a dielectric constant, a first plurality of electrical conductors on one surface of said base member, and a second plurality of electrical conductors on the other surface of said base member, said first and second pluralities of conductors arranged in vertical alignment to that an associated pair of conductors is mounted on the opposite surfaces of said base member thereby to form an effective transmission line, said first and second pluralities of conductors on said connector mating with the pluralities of conductors on said mounting assemblies to provide continuous transmission lines wherein the characteristics of the several transmission lines are dependent upon the width of the respective conductors, the spacing therebetween and the dielectric constant of said spacing, and said characteristics are substantially similar in all said continuous transmission lines.

10. The connector device recited in claim 9 wherein the conductors in each of said pluralities of conductors are arranged in parallel.

References Cited by the Examiner

UNITED STATES PATENTS

| | | | |
|---|---|---|---|
| 2,774,046 | 12/1956 | Arditi et al. | 333—84 |
| 2,926,317 | 2/1960 | Blatz | 333—84 |
| 2,961,622 | 11/1960 | Sommers | 333—82 |
| 2,964,718 | 12/1960 | Packard | 333—73 |
| 2,969,510 | 1/1961 | White | 333—33 |
| 2,984,802 | 5/1961 | Dyer | 333—73 |

OTHER REFERENCES

Publication I: "Direct-Bonded Copper-Clad Teflon High-Temperature" (McElroy et al.), published on Electrical Manufacturing, October 1957 (pages 126–128 relied on).

HERMAN KARL SAALBACH, *Primary Examiner.*

JOHN P. WILDMAN, *Examiner.*